United States Patent [19]
Maloof et al.

[11] 4,440,155
[45] Apr. 3, 1984

[54] SOLAR CONCENTRATING LENS AND RECEIVER

[75] Inventors: Ralph P. Maloof, Calabasa; Roger R. Reynolds, Jr., Costa Mesa, both of Calif.

[73] Assignee: Reynolds & Taylor, Inc., Santa Ana, Calif.

[21] Appl. No.: 284,514

[22] Filed: Jul. 17, 1981

[51] Int. Cl.³ ............................................. F24J 3/02
[52] U.S. Cl. .................... 126/440; 126/439; 126/425; 350/452
[58] Field of Search ............... 126/438, 425, 424, 440, 126/439, 450, 448, 443; 350/451, 452, 260, 263, 262, 264, 261, 265

[56] References Cited

U.S. PATENT DOCUMENTS

| 3,884,217 | 5/1975 | Wartes | 126/438 |
| 4,114,597 | 9/1978 | Erb | 126/448 |
| 4,289,118 | 9/1981 | Stark | 126/440 |
| 4,323,052 | 4/1982 | Stark | 126/440 |

FOREIGN PATENT DOCUMENTS

| 555420 | 6/1923 | France | 126/440 |
| 723996 | 1/1932 | France | 350/452 |
| 56-48101 | 1/1981 | Japan | 126/440 |

*Primary Examiner*—James C. Yeung
*Attorney, Agent, or Firm*—William H. Maxwell

[57] ABSTRACT

A solar concentrating lens and receiver operating on azimuth and altitude axes according to the position of the sun and characterized by an array of elongated transparent slats spaced for ventilation and each of prism-lens configuration with a reflective base, for both refractive and reflective focus of heat rays through a narrow slot into a receiver and onto an absorber at a focal plane where heat absorption is into a fluid media within an insulated and vacuumized internally reflective chamber.

22 Claims, 11 Drawing Figures

FIG. 1.

SOLAR CONCENTRATING LENS AND RECEIVER

BACKGROUND

Solar radiation is a prime source of energy, collected by means referred to generally as "insolation", it being a general object of this invention to efficiently capture heat energy from the sun rays by means of optical concentration and fluid media absorption. Solar concentration is of primary concern, it being the heat rays which are to be concentrated at a focal plane with the least loss. The geometric concentration is to be, for example, one hundred to one, whereby 500°–700° F. fluid is produced from the absorber at pressure up to, for example, 700–800 p.s.i.

Heretofore, lens and mirror systems for insolation have been cumbersome and space consuming, and the receivers and absorbers have been wasteful of incoming light. That is, very large areas have been required for solar collection, and there has been dispersion of otherwise useful light ahead of and at the absorber target. It is acknowledged that the objective area is a controlling factor which determines the quantity of light to be collected and subsequently concentrated, and it is this area which is minimized by the present invention by employing a "prism-lens" objective array having a number of advantageous features as hereinafter described. The optical concentration of light provided by the prism-lens array is focused upon a plane within the receiver, entering therein through a narrow slot-shaped window, to be captured within the internally reflective confines of the vacuumized receiver and concentrated onto the absorber, as will be described.

The "prism-lens" array which characterizes the solar light objective area of the present inventive concept is comprised of a multiplicity of linear light concentrators of slat configuration. It is an object of this invention to concentrate light by focusing it upon the absorber plane, utilizing each slat as a lens and for example a convex lens having camber that focuses onto the absorber focal plane. It is the infrared heat rays which have greatest heat value and which are of longer wave length focused upon said absorber focal plane, while the ultraviolet light at the opposite end of the spectrum and of shorter wave length is of less effective heat value and is focused short of said focal plane. In accordance with this invention, it is an object to concentrate the useful solar light and especially the Yellow to Red light, Blue to Violet light being marginally useful. Therefore, the receiver of this invention is characterized by its "slot" window through which the useful solar light is concentrated and focused upon the absorber focal plane. A feature is that each slat is a prism-lens focused upon the absorber focal plane.

The slat prism-lens array as it is disclosed herein is similar to a Fresnel Lens, and accordingly is a weight saving feature. However, this slat prism-lens array must be exposed to the natural environment, namely the wind element of the atmosphere, and it is wind gusts to which the apparatus is subjected and to which it must be structurally resistant. Accordingly, the slat elements of this lens array are spaced for ventilation, but without sacrifice with respect to light collection efficiency, the base of each prism-lens cross section being disposed so as to reflect light through said space and onto the focal plane of the absorber. Note that this spacing increases toward the opposite ends of the array, the array being symmetrical about a central projection plane.

Efficiency of insolation requires minimized attenuation of incoming solar light and reduction of re-radiation. Accordingly, it is an object of this invention to provide an efficient prism-lens array and efficient receiver-absorber combination. Lenses of acrylic are employed for their low (8% per inch thickness) attenuation, and the "slot" window receiver is internally reflective and vacuumized and/or internally insulated.

The "prism-lens and slot absorber" combination of the present invention is a linear apparatus, in that the slats and slot receiver-absorber are elongated for the reception of large quantities of solar light concentrated upon a restricted focal plane area. As shown, the prism-lenses and receiver-absorber are disposed in parallel relation, so that light from the entire area of the slat array is projected through the slot and onto the focal plane target. In practice, the concentration of solar light is within a feasible range of use, for example within the aforesaid range of 500°–700° F., and distributed along the "slot" window and evenly upon the focal plane and absorber elements, whereby common commercially available materials are useable in constructing the receiver and its supporting structure. Only at the focal plane is any of the apparatus subjected to high heat, and only to that structure which is in close proximity to the concentrated light.

Solar tracking is to be considered, it being an object of this invention to simplify tracking with single or a dual axis system responsive to the azimuth and at least the altitude positions of the sun, regardless of the latitude and longitude placement of the apparatus. The slat lens array herein disclosed is particularly adapted to either single or dual axis tracking, it being a simple matter to track each function of the sun's position within the resolution desired, as will be described. Accordingly, there are means that separately determine or detect movement of the sun's azimuth and/or altitude, and which actuate drive motors that position the apparatus within the accuracy required for projection of all incoming solar light through the "slot" window and onto the absorber focal plane within the receiver.

SUMMARY OF INVENTION

This invention relates to insolation and to the absorption of heat into a transfer media, by means of optical concentration of heat rays into the confines of a receiver. The optical system employed herein is characterized by a multiplicity of transparent slats that are spaced for ventilation and which are of prismatic lens-shape for refraction and focus of heat rays upon a focal plane where absorption is to occur. Each "prism-lens" is of prism-like cross section having a reflective first surface base that also focuses heat rays passing between spaced slats and onto the said focal plane where absorption is to occur. The array of slats is carried by spaced beams cambered so as to accommodate the reflective light path between prism-lens slats, as they are displaced from a central projection plane extending to the centerline of the focal plane. The outermost prism-lens slat is of full isosceles cross section having an apex and with its base facing said projection plane, while each progressively inward prism-lens slat is of reduced apex angle and has its apex truncated more severely and its base diminished, whereby mass is minimized while retaining sufficient strength. Each prism-lens is of a cross sectional configuration involving a precise angle, width and base depth that will focus a full band of heat rays through the "slot" of the receiver and onto the focal plane of the absorber. The receiver is characterized by the slot-shaped window through which the heat rays of solar light are concentrated onto a heat absorption target at the focal plane. A feature is the narrowness of the "slot" and the openness of the vacuumized reflective interior of the absorber where heat is taken into a fluid heat transfer media circulating through the absorber. This prism-lens array and absorber combination is journaled on a vertical azimuth axis and at least on a horizontal altitude axis, or compound axes combining the two, upon which axes or axis it is directed toward the incoming and parallel sunlight. Tracking is by means of a programmed clock means or by means of light sensors that detect position of the sun and actuate motor means to make corrective movements on said vertical and/or horizontal axes, all in order to maintain the projection plane coincidental with and parallel to the incoming sunlight, within a prescribed degree of accuracy or resolution. Any number of these units of apparatus can be arranged and used together as a multiple array.

The various objects and features of this invention will be fully understood from the following detailed description of the typical preferred forms and applications thereof, throughout which description reference is made to the accompanying drawings, in which:

PREFERRED EMBODIMENT

Figure 1:
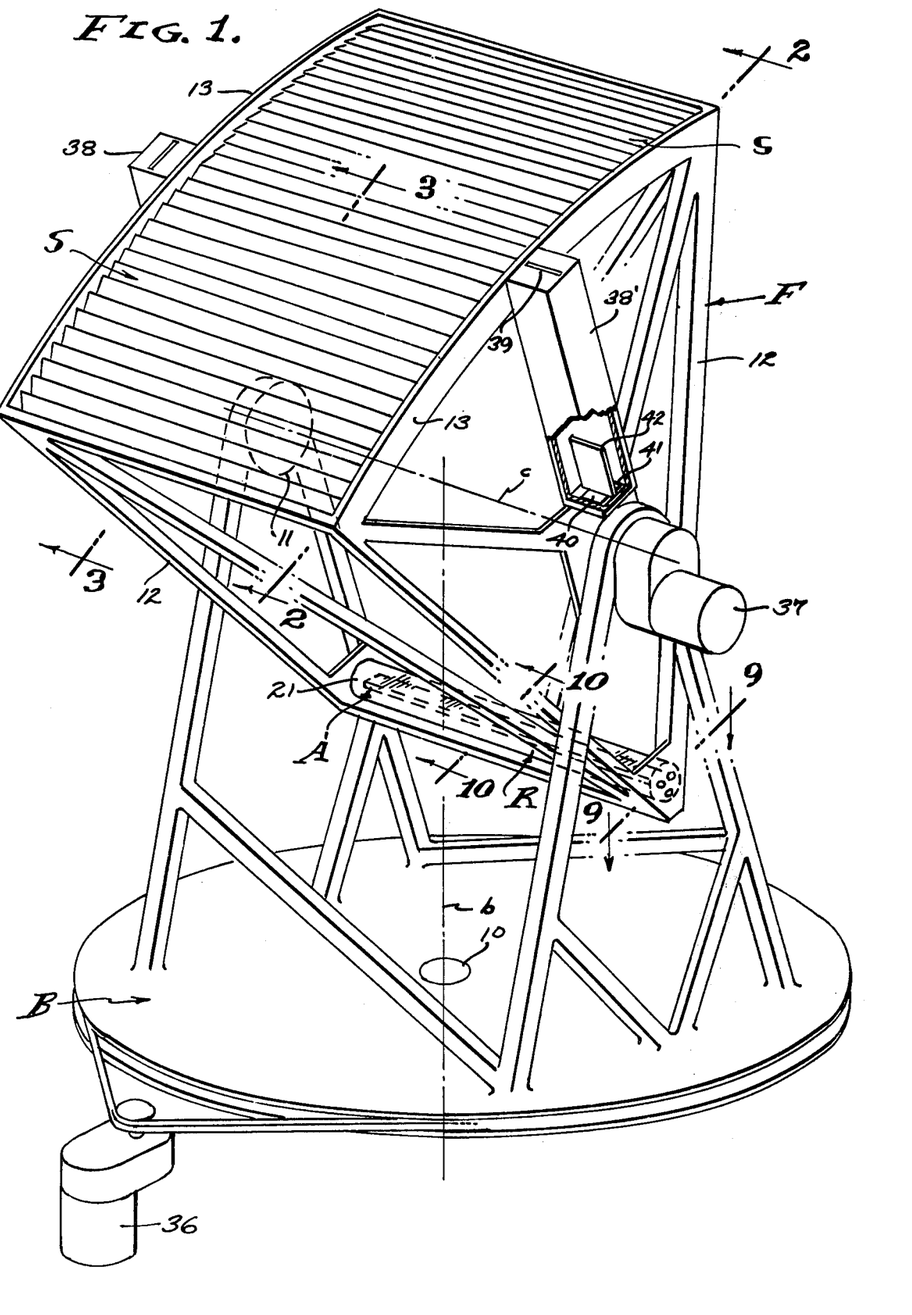
FIG. 1 is a perspective view of a Solar Concentrating Lens and Receiver embodying the features of the present invention.
Figure 2:
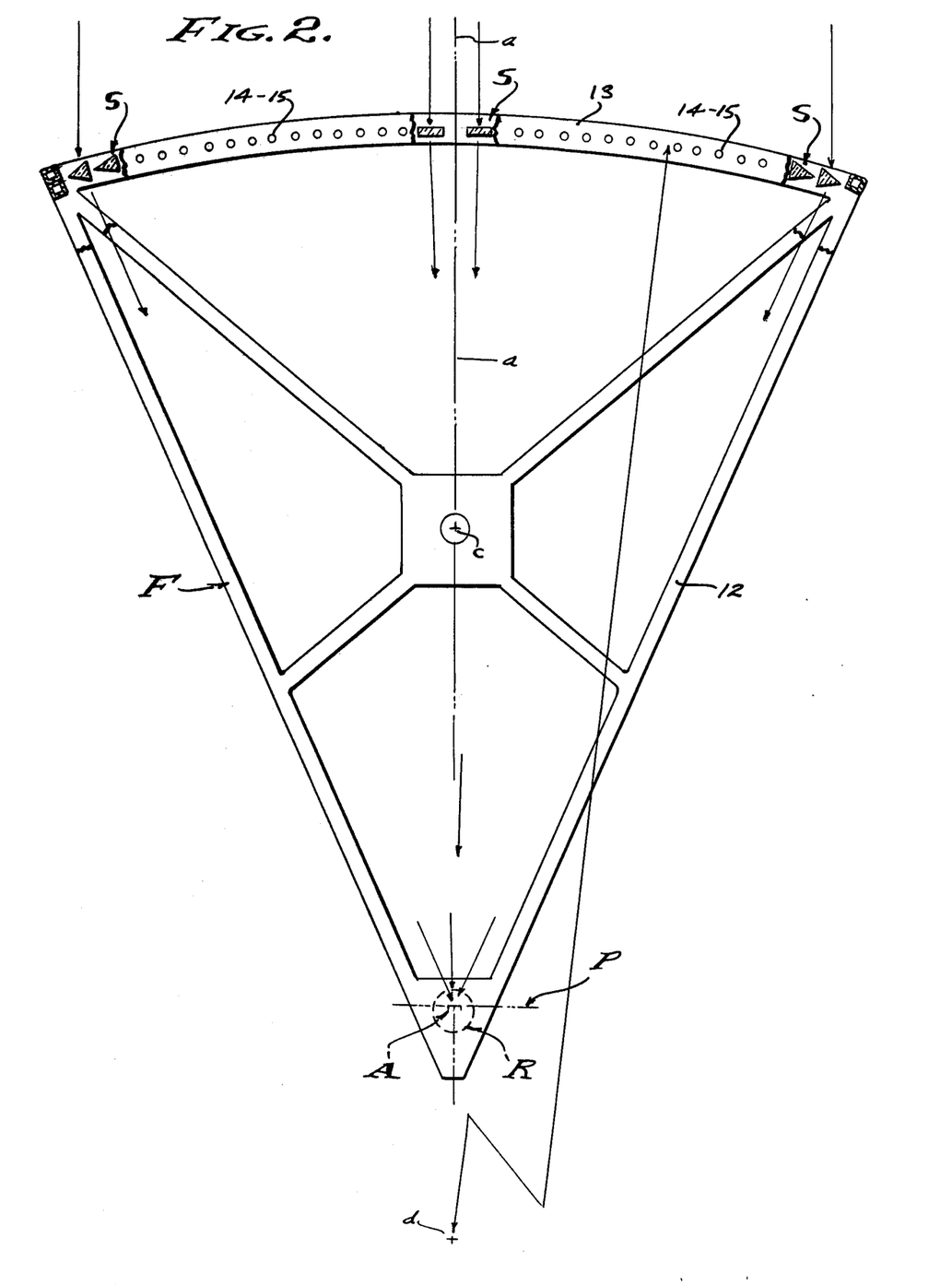
FIG. 2 is an enlarged view of the frame, lens array and receiver, taken as indicated by line 2—2 on FIG. 1.

Referring now to the drawings, there is a projection plane a that is to be maintained parallel with the incoming sunlight, within a prescribed degree of accuracy. In order to do so, there is a vertically disposed azimuth axis b and at least a horizontally disposed altitude axis c. By setting or revolving the apparatus about axis b the axis c is brought substantially or exactly normal to the azimuth position of the sun, and by revolving the apparatus about axis c the projection plane a is brought into parallel relation with the incoming light. Accordingly, there is a base B that revolves on bearings 10 disposed on vertical axis b and carries spaced trunnions 11 on horizontal axis c. The tracking optical array and receiver-absorber combination is carried by a frame F journaled on and within the spaced trunnions 11, a space-frame comprised of spaced side trusses 12, or the like, between which transparent slats S and a receiver R extend. The absorber A is centered within the receiver R at the lower apex of the frame trusses, and the slats S occupy the upper widened objective end of the frame trusses disposed toward the incoming sunlight. The frame F is rigid and openly supports the slats S for ventilation, and all of which is free to revolve on the horizontal altitude axis c.

Figure 3:
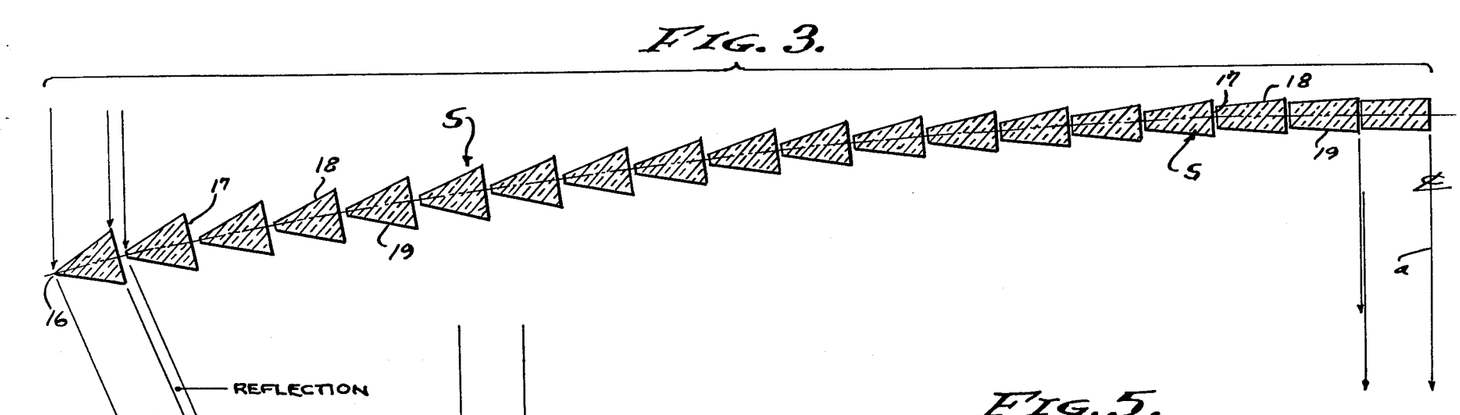
FIG. 3 is an enlarged detailed sectional view showing half of the prism-lens array and taken as indicated by line 3—3 on FIG. 1.

The objective ends of the spaced trusses 12 are comprised of like or identical outwardly cambered beams 13 arcuately formed about a center d substantially below a focal plane P, as shown. In practice, the radius to d is approximately twice that of the radius to the focal plane P, as determined by the positioning of adjacent slats S and their revolvement that places their reflective bases in position to redirect the incoming sunlight through the intermediate spaces and to the target. The slats S extend between the beams and are adjustably secured thereto by pivots 14. The individual slats S are set into proper rotative position parallel with the centerline of focal plane P as by means of lock nuts 15 at said pivots 14. The frame, beam and slat array are symmetrically disposed about the projection plane a, the slats S being parallel one with the other and with the projection plane a.

The slat S array carried by the arcuately cambered beams 13 is semi-cylindrical, with the individual slats S carried on said mean radius from a center of arc d. In a reduction to practice of this invention, there are nineteen slats S at each side of the projection plane a, a total of thirty eight slats S. The radius to arc center d is approximately 260 inches while the radius from each slat S to the absorber A is optimum. Assuming the slats S to be flat faced prisms, a sheet of light substantially equal to the width of the prism will be projected, for example as shown a width of 3.03 inches. However, it is preferred that the prisms are cambered to have a lens effect that focuses the incoming sunlight onto the centerline of the absorber A target. Accordingly, an aperture 20 is provided to pass these sheets of light from multiple prism-lenses and into the receiver R, in practice a 50° slot opening in the receiver body which in a reduction to practice of this invention is six inches in diameter, and for example with a one inch absorber widened to one and a quarter inches so as to accommodate stray light. These dimensional proportions are significant as related to the slat spacing for ventilation and for reflection off of the bases 17 and projection of all light onto the focal plane.

Figure 4:
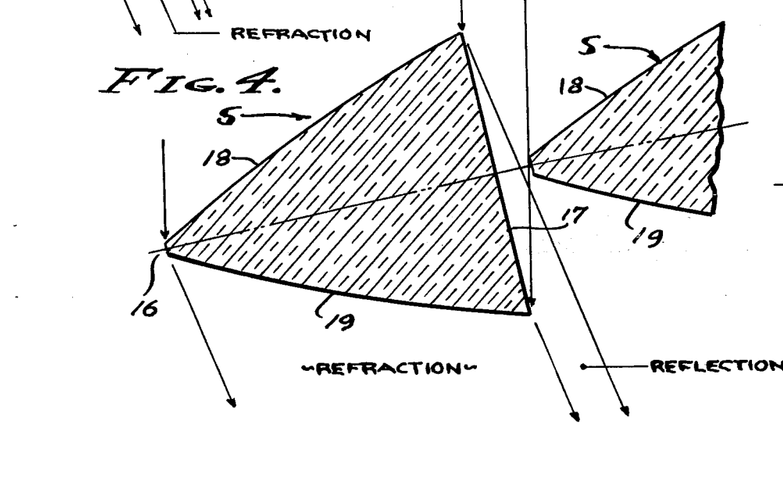
FIG. 4 is an enlarged fragmentary view showing the prism-lens of FIG. 3 having the greatest refraction and reflection angles.
Figure 5:
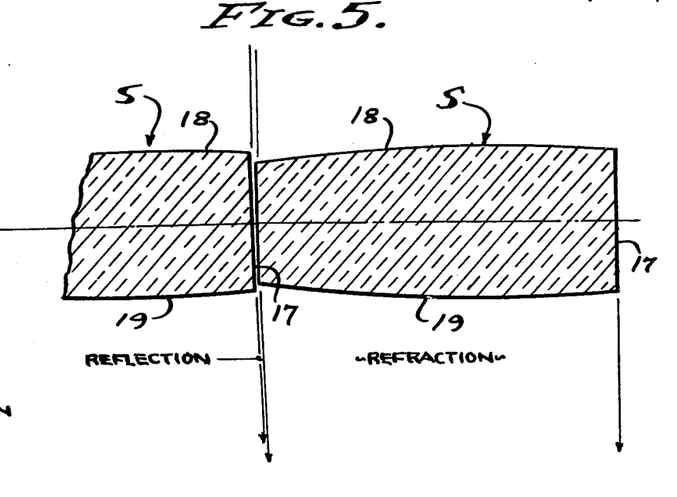
FIG. 5 is an enlarged fragmentary view showing the prism-lens of FIG. 3 having the least refraction and reflection angles.

Each slat S is of basic prism cross section with its apex 16 disposed outwardly from the projection plane a, and with its base 17 disposed inwardly toward the projection plane a. Each slat S is of isosceles cross section with like or identical sides 18 and 19 extending inwardly from the apex 16, and the base 17 is disposed at an angle that reflects incoming parallel sunlight in continuing parallel relation onto the focal plane P. This slat cross section is prismatic and provides for refraction of light transmitted through the sides 18 and 19, and provides for reflection of light striking the base 17.

Each prism cross section of a slat S is precisely formed to have an apex angle adapted to project a sheet of light totally entering the aperture 20 slot, varying from 45° at the outermost slats S, to 2.7° at the innermost slats S. The 45° maximum is chosen for reasonable light transmission efficiency of the prisms, limiting attenuation to approximately 10%. Also, each slat S is precisely formed to have a truncated apex adapted to enable strengthening of the slats. S by separating the sides 18 and 19. In practice, the sides 18 and 19 are separated so that all slats S have approximately the same cross sectional area, for rigidity as they extend between the beams 13. Accordingly, the apex truncation and base 17 dimensions vary with the result that the remaining altitude of the prism slats S, from truncation face to base 17, varies for example from 2.81 inches at the outermost prism slats S, to 3.03 inches at the innermost prism slats S. These dimensions determine the spacing of adjacent prism slats S, whereby each reflective base 17 is entirely exposed to all sunlight passing between adjacent slats.

Structurally, the slats S of prism cross section are made of a plastic material such as "Lucite" as manufactured by Dupont, a high quality cast optical acrylic of low attenuation (8% per inch of thickness) having an index of refraction of 1.49 and a light transmission of 92%. A feature therefor is the light weight of the plastic having a specific gravity of 1.19, the slats being of slender cross section adapted to remain straight due to rigidity of the plastic material. Thermal expansion and contraction has little or no adverse effect on the slats S and their ability to refract and to reflect light, despite the large objective areas and intense sunlight that may be involved and concentrated thereby, due to their separation and individual structural integrity and resistance to destruction.

In accordance with this invention, the rotated position of each prism slat S simultaneously adjusts both the refractive and reflective projection of light through aperture 20. That is, the incoming parallel sunlight rays are redirected both refractively and reflectively by each prism slat S, to be projected in substantially parallel relationship. A feature is that the shadow of light from the apex or the truncated apex end of one prism slat S is cast to the inwardly turned edge of base 17 of the next adjacent prism slat S spaced therefrom for ventilation and said reflective passage of light. It will be observed from FIGS. 3-6 that all parallel incoming sunlight striking the prism-lens slats S is projected to the target absorber A, and that the multiplicity of prism-lenses are adjacently arranged closely but so that one does not shadow the other. Consequently, all incoming sunlight is projected by refraction and reflection to concentrate upon the target absorber A at the focal plane P. There is virtually no waste of incoming light. Therefore, all sunlight entering the objective array of prism slats S is projected toward the receiver R, said projected light continuing in substantially parallel rays from each prism slat S. It will be observed therefore, that the slat openings increase progressively toward the outward slats S which are wider based and rotated to a greater reflective angle.

Figures 6, 7, 8:
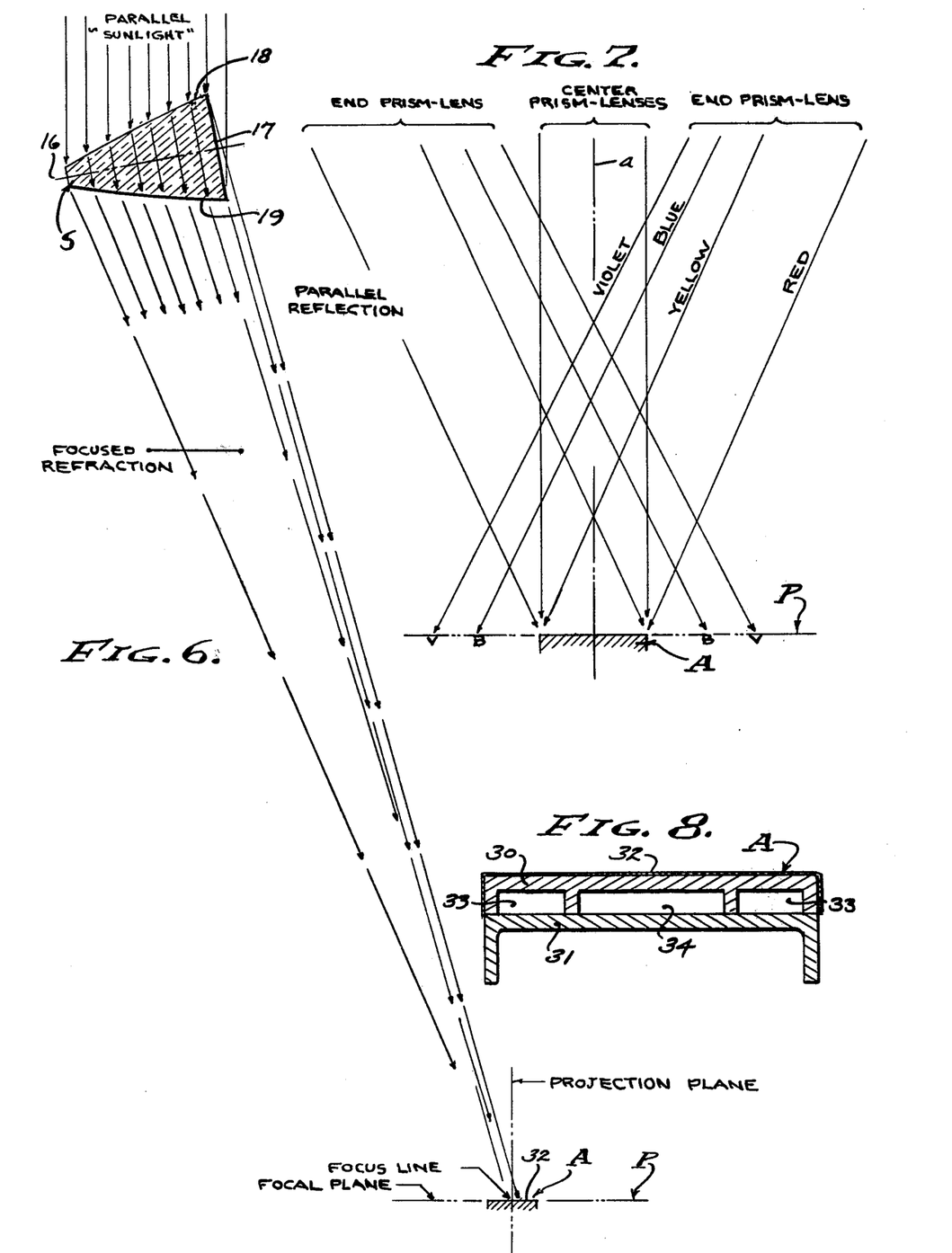
FIG. 6 is an enlarged sectional view of an intermediate prism-lens and absorber, showing the focus to a line at the focal plane.
FIG. 7 is a diagramatic view showing the concentration of heat rays onto the absorber, and the colder rays to the sides thereof.
FIG. 8 is an enlarged detailed sectional view of the absorber.

The phenomenon of prismatic refraction produces a spectrum in the form of an array of components of light separated according to different wave length, while the phenomenon of lens refraction produces a focused image and concentration of light at a focal plane. Prismatic separation is the result of changes in wave length, a divergence of light from the longer infrared to the shorter ultraviolet rays. Lens focus is the result of bending the light. In practice and with the reduction to practice disclosed herein, one or both sides 18 and 19 is cambered as they are shown and formed to an approximate 190 inch radius so as to have a focal length of approximately 132 inches with yellow light. Since it is heat range light which is to be collected by absorption, it is the yellow to infrared rays which are sought to be captured, and accordingly it is this range of longer light waves which are focused onto the centerline of the absorber A by the prism-lens slats S of the present invention. Therefore, it will be seen firstly, that a multiplicity of sheets of substantially parallel incoming sunlight are turned by the prismatic refraction of each slat S to be dominated by the yellow to infrared heat range rays; and secondly, that this heat range of light rays is inwardly focused by the convexly cambered sides 18 and 19 to concentrate toward the centerline of the absorber A at focal plane P.

The phenomenon of dispersion is produced by refraction (not by reflection) and results in a separation or divergence of light rays from the focus line which is at the centerline of the focal plane P. Therefore, and despite the focal length of the convexly cambered sides 18 and 19, dispersion causes some spreading of the focused light rays. Consequently with the present invention, there is a concentration of heat rays toward the centerline of focal plane P, the centerline through which projection plane a passes. It is at this centerline of the focal plane P that the highest heat concentration is developed.

The receiver R and absorber A comprise an insolation device that collects the heat of absorption into a heat transfer fluid media, by which heat energy is transported for useful purposes. The array of cambered slats S results in a narrow concentration of heat range light onto the focal plane P and embracing the centerline of the absorber A. Accordingly, the aperture 20 is of sufficient width (see FIG. 10) to pass the convergent sheets of concentrating light rays from the multiplicity of prism-lenses, and centered on plane a. As shown, the receiver R involves a closed chamber C into which the aperture 20 slot opens and in which the insolation target or absorber A is suspended in a partial vacuum, or insulated as will be described.

Figure 10:
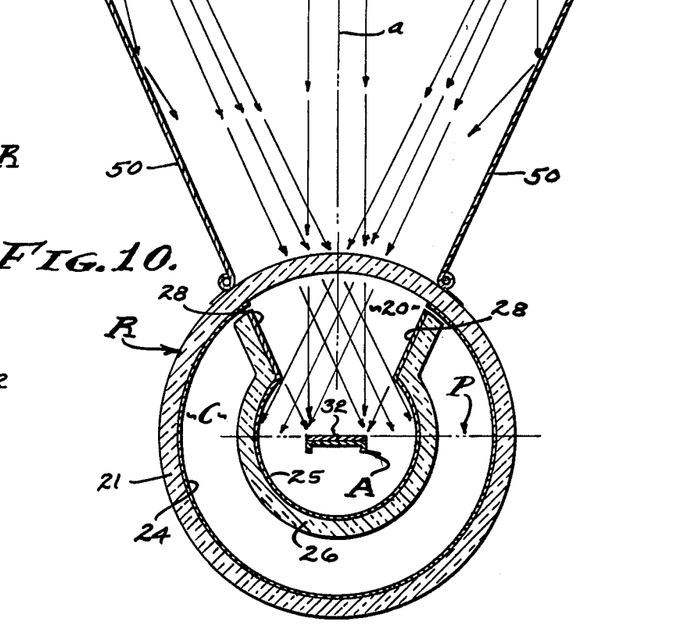
FIG. 10 is an enlarged transverse sectional view of the open receiver and taken as indicated by line 10—10 on FIG. 1, and, FIG. 11 is a view similar to FIG. 10 showing the receiver closed and with a modified form of insulation.

The receiver R is preferably a cylindrical tube 21 of transparent acrylic plastic, as above referred to, of low heat conductivity closed at opposite ends by insulating walls 22 that are secured to the trusses 12 of the frame F. As shown, a vacuum pump (not shown) draws through line 23 from the interior of the closed chamber C, a vacuum of, for example, 1/1000 atmosphere. The center of tube 21 is at the focal plane P and the wall of the tube is clear and transparent. In the reduction to practice disclosed herein, the objective angle of concentration is 50°, in which case a window or slot of commensurate angular opening is left remaining through the wall of the tube, centered on the projection plane a, while the remaining interior of the tube wall is interiorly reflective. As shown, the interior of tube 21 is lined with a reflective shield or coating 24.

The insolation target is the absorber A suspended in the receiver at the center thereof and provided to receive the heat of absorption and to conduct it into a heat transfer media such as for example a liquid so as to achieve higher temperature without evaporating. The absorber A is partially surrounded and embraced by a shield 25, and it is a flat plate or band substantially coextensive in width with the effective concentration of heat rays at the focal plane P. As shown, the absorber A is elongate and coextensive with the receiver tube 21, and its widened face 32 disposed diammetrically within the tube and coincidental with the focal plane P centered on the projection plane a. In practice, the band width of the absorber A is substantially narrower than the aperture 20 slot.

The shield 25 is a partial cylinder with a reflective inner surface secured to the end walls 22 of the receiver and disposed concentric with the tube wall thereof. The shield 25 is open sided with an aperture opening of 50° to pass all incoming sunlight that concentrates through the aperture 20 slot. The interior of shield 25 is approximately twice the diameter as the absorber width and/or aperture opening therethrough, and its interior is highly reflective. As shown, the shield 25 is carried by a member 26 formed of structural insulation.

In accordance with this invention, the absorber A is a laminate structure channeled for the transport of fluid media therethrough. Accordingly, the absorber A is comprised of a target lamina 30 and a support lamina 31, bonded together as by furnace brazing. The target lamina 30 is formed of a material having high heat conductive properties such as copper and externally coated with a black chrome surface 32 or the like. The support lamina 31 is formed of a material having lower heat conductive properties such as a stainless steel which has strength for support. The lamina 30 is longitudinally grooved to provide a plurality of fluid channels closed by the lamina 31 bonded thereto, lamina 31 having depending flanges for beam strength. As shown in FIG. 8, the laminae 30-31 have planar faces that are brought permanently together. The fluid media is routed into the marginal channels 33 of the absorber to emanate from a central channel 34, for the progressive increase of heat absorption. Insulation is by means of the vacuum drawn from chamber C through line 23. In the second embodiment of FIG. 11, insulation is by means of a high temperature window tube 35 surrounding the shield 25' and by an insulation carrier 26' that occupies the annulus between the shield 25' and tube 21 wall, the aperture 20 area remaining open through both the tube 21 and tube 35 and between the flanges 28'. In practice, the window tube 35 is made of a heat resistant glass such as "Pyrex" or the like. The chamber C within tube 35 may or may not be vacuumized.

Figure 11:
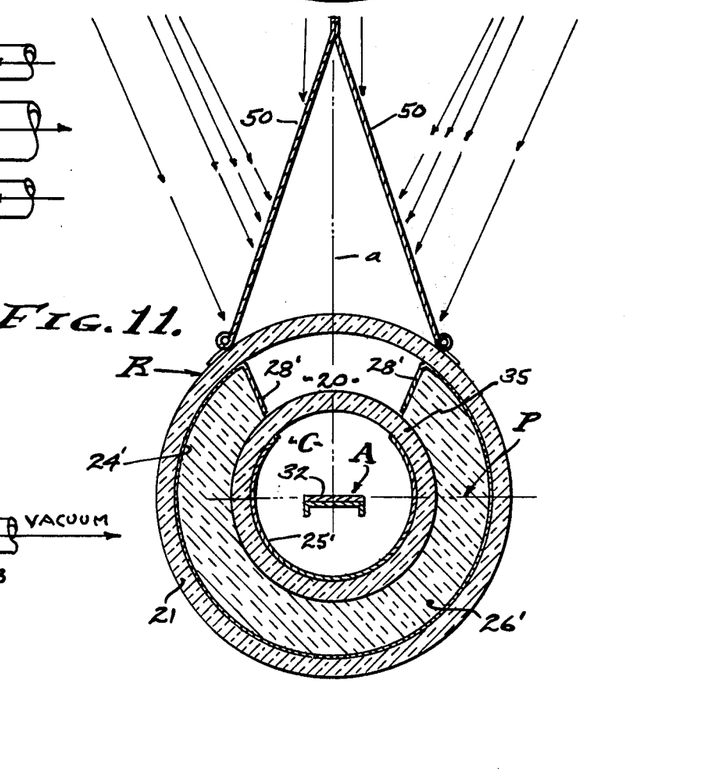

It will be observed that the shield has marginal flanges 28 in the FIG. 10 embodiment, which define the slot 20 as it opens between the target absorber A and tube 21 wall of the receiver R. In the FIG. 11 embodiment the reflective layer 24' has marginal flanges 28' which define the said slot 20. The flanges 28-28' too are highly reflective at their inner faces to collect and redirect stray light. There is a phenomenon knwon as "Sky-Shine", or the presence of scattered light as will occur on hazy days when particles in the atmosphere causes sunlight to diffuse in many direction. It is known that this scattered light can be collected and/or accumulated even though it is not direct in the sense of emanating in parallel rays of sunlight. Accordingly, and referring particularly to FIGS. 10 and 11 of the drawings, this invention provides reflective shutters 50 that close as shown in FIG. 11 to protect the absorber A when it is not conditioned to receive high heat, and that opens as shown in FIG. 10 to collect scattered "Sky-Shine". As shown, the shutters 50 are flat internally reflective panels pivoted outside the convergence of light concentration, to be planar with the reflective flanges at a 50° included angle as shown. The shutters 50 are longitudinally coextensive with the receiver slot 20, and consequently stray light is concentrated into the receiver R and onto the absorber A.

The lens array and solar absorber hereinabove described is adaptable to either single or dual axis tracking. When geographic location does not create too great a variation in azimuth position of the sun, single axis altitude tracking is in order. However, when azimuth position changes too greatly, or when greatest efficiency is required, then dual axis azimuth and altitude tracking is in order. As shown, the axis to be motivated is controlled by a programmed drive or clock means, or by sun position sensors, whereby tracking is accomplished. As shown, there is a gear motor 36 that revolves the base B on the vertical azimuth axis b, and there is a gear motor 37 that revolves the frame F on the horizontal altitude axis c.

Figure 9:
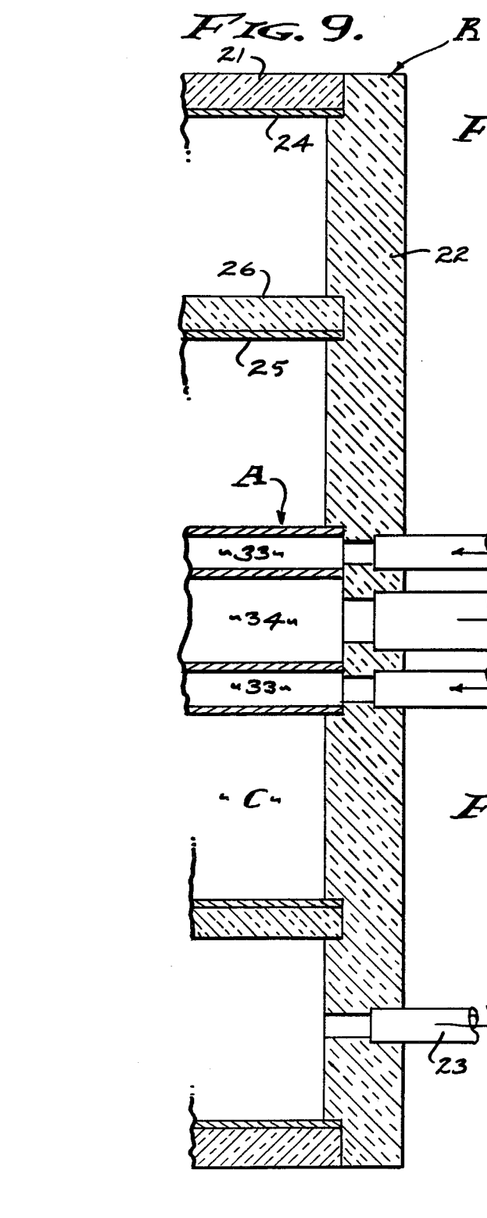
FIG. 9 is an enlarged detailed plan sectional view through the end mounting of the receiver-absorber and taken as indicated by line 9—9 on FIG. 1.

For programmed tracking, a programming clock means is supplied with azimush and/or altitude information on sun positions for the instants in time throughout each successive day, and this clock means governs the rotative position or positions of said axes. For position sensing tracking, a sun position sensor is provided for the tracking axis to be controlled. As shown, a tracking tube 38 is aligned normal to the axis c so as to detect azimuth position of the sun, and a tracking tube 38' is aligned with the projection axis a so as to detect altitude position of the sun. The tracking tubes 38 and 38' are alike and each is elongated with a slotted aperture 39 at its objective end, and with spaced light sensor means such as photo cells 40 and 41 at its remote base end. The slotted aperture is parallel with the axis to be controlled and the sensor cells 40 and 41 are separated by a partition 42 and actuate the gear motors 36 or 37 as the case may be, to operate forwardly and reversely. A shaft of light enters through the slotted aperture 39 to play on either sensor 40 or 41, with accuracy predetermined by narrowness of the said aperture and its distance from the controlling sensor cells. In practice, search sensor cells are located near the aperture for initial tracking, to be switched off when normal tracking is in process.

From the foregoing it will be seen that all incoming sunlight is effectively utilized, by both refraction and reflection to enter through a narrow slot into a vacuumized chamber where heat of absorption is collected into a fluid transfer media for transmission to a useful purpose. The capture of heat energy is efficiently conserved within the insulated confines of the internally reflective receiver, re-radiation being restricted by the narrow slot aperture through which all incoming sunlight enters for concentration along the projection plane and at the focal plane of the multiple prism-lens array.

Having described only the typical preferred forms and applications of our invention, we do not wish to be limited or restricted to the specific details herein set forth, but wish to reserve to ourselves any modifications or variations that may appear to those skilled in the art as set forth within the limits of the following claims.

We claim:

1. A solar concentrating lens and receiver operable in alignment with incoming sunlight, and including;

a multiplicity of parallel transparent elongated slats spaced apart in an array for the passage of light and to ventilate therebetween for reducing wind resistance, and each slat being of basic prism cross section with its apex disposed outwardly from a projection plane aligned with the incoming sunlight, an elongated receiver longitudinally coextensive with and spaced from the array and on said projection plane in parallel relation to each of the slats, and each of the slats having upper and lower sides inwardly divergent from its apex and angularly related for projection of the incoming sunlight through the slats and into the receiver, and having a base faced toward the projection plane and angularly disposed for reflection of the incoming sunlight through the spaces between the slats and into the receiver.

2. The solar concentrating lens and receiver as set forth in claim 1, wherein the slats are spaced a distance apart to cast the light shadow from the apex end of one slat to the edge at the lower side of the next adjacent slat.

3. The solar concentrating lens and receiver as set forth in claim 1, wherein the upper and lower sides of the slats are divergent to refract the incoming sunlight into the receiver.

4. The solar concentrating lens and absorber as set forth in any one of claims 1, 2 or 3, wherein an array of said parallel transparent elongated slats extends symmetrically from opposite sides of the projection plane.

5. The solar concentrating lens and absorber as set forth in any one of claims 1, 2 or 3, wherein each of said slats of basic prism cross section has at least one of its sides cambered to focus incoming sunlight to a focal plane within the receiver.

6. The solar concentrating lens and receiver as set forth in claim 1, wherein the upper and lower sides of each of the multiplicity of parallel transparent elongated slats are increasingly acute in angular relation progressively toward the projection plane.

7. The solar concentrating lens and receiver as set forth in claim 1, wherein the slats are spaced a distance apart to cast the light shadow from the apex end of one slat to the edge at the lower side of the next adjacent slat, and wherein the upper and lower sides of each of the slats are increasingly acute in angular relation progressively toward the projection plane.

8. The solar concentrating lens and receiver as set forth in claim 1, wherein the upper and lower sides of the slats are divergent to refract the incoming sunlight into the receiver, and wherein the upper and lower sides of each of the multiplicity of slats are increasingly acute in angular relation progressively toward the projection plane.

9. The solar concentrating lens and absorber as set forth in any one of claims 6, 7 or 8, wherein the apex of each inwardly adjacent slat is truncated to increasingly separate the upper and lower sides of the slats progressively toward the projection plane, thereby increasing the beam depth of the slats having increasingly acute related sides for rigidity.

10. The solar concentrating lens and absorber as set forth in any one of claims 6, 7 or 8, wherein an array of said parallel transparent elongated slats extends symmetrically from opposite sides of the projection plane.

11. The solar concentrating lens and absorber as set forth in any one of claims 6, 7 or 8, wherein each of said slats of basic prism cross section has at least one of its sides cambered to focus incoming sunlight to a focal plane within the receiver.

12. The solar concentrating lens and receiver as set forth in claim 1, wherein the upper and lower sides of each of the slats are increasingly acute in divergent angular relation progressively toward the projection plane and the upper sides thereof cambered to have a lens effect and refract the incoming sunlight into focus at the receiver.

13. The solar concentrating lens and receiver as set forth in claim 1, wherein the upper and lower sides of each of the slats are increasingly acute in divergent angular relation progressively toward the projection plane and the lower sides thereof cambered to have a lens effect and refract the incoming sunlight into focus at the receiver.

14. The solar concentrating lens and receiver as set forth in claim 1, wherein the upper and lower sides of each of the slats are increasingly acute in divergent angular relation progressively toward the projection plane and both the upper and lower sides thereof cambered to have a lens effect and refract the incoming sunlight into focus at the receiver.

15. A solar concentrating lens and receiver—absorber operable in alignment with incoming sunlight, and including:

a projection plane aligned with the incoming sunlight, an array of transparent elongated slats disposed in parallel relation to and from at least one side of the projection plane, said slats spaced apart for the passage of light and to ventilate therebetween for reducing wind resistance, and each slats being of basic prism cross section with its apex disposed outwardly from the projection plane aligned with the incoming sunlight, an elongated receiver coextensive with and spaced from the array and on said projection plane in parallel relation to each of said slats and comprising a chambered body of transparent plastic having a window tube of transparent glass of high temperature properties supported coextensively within the chambered receiver body with an annulus therebetween and forming an inner chamber to enclose an elongated absorber to receive projected incoming sunlight, the absorber extending coextensively within the receiver and spaced from the array and on said projection plane in parallel relation to each of the slats to receive projected incoming light, and each of the slats having upper and lower sides divergent from its apex and angularly related for concentration of the incoming sunlight through said slats and into the receiver, and having a base faced toward the projection plane and angularly disposed for reflection of the incoming sunlight through the spaces between the slats and into the receiver and onto the absorber.

16. The solar concentrating lens and absorber as set forth in claim 15, wherein the receiver window is of slot formation to receive all projected incoming sunlight.

17. The solar concentrating lens and absorber as set forth in claim 15, wherein the receiver is internally reflective to capture and redirect rays of light entering therein and onto the absorber.

18. The solar concentrating lens and absorber as set forth in claim 15, wherein a reflective shield is disposed longitudinally coextensive within the chamber body and embraces the absorber and restricts the window of the receiver to a slot formation to receive all projected incoming sunlight.

19. The solar concentrating lens and absorber as set forth in any one of claims 16 through 18, wherein an internally reflective shield is carried within the chambered receiver body and slotted to receive incoming sunlight.

20. The solar concentrating lens and absorber as set forth in any one of claims 16 through 18, wherein the window tube of transparent glass is supported co-extensively within the chambered receiver body with insulation therebetween slotted to receive incoming sunlight.

21. The solar concentrating lens and absorber as set forth in claim 18, wherein the shield is supported with structural insulation exterior thereto.

22. The solar concentrating lens and absorber as set forth in claim 18, wherein the shield is supported by structural insulation exterior thereto and disposed between said shield and the receiver body to occupy the space therebetween.

* * * * *